W. DRIPPS.
Harvester Cutter.
No. 15,843.  Patented Oct. 7, 1856.
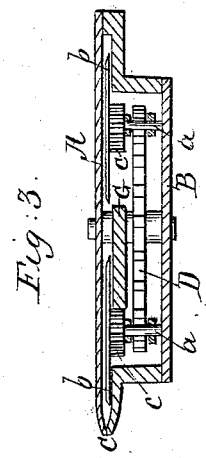
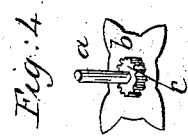
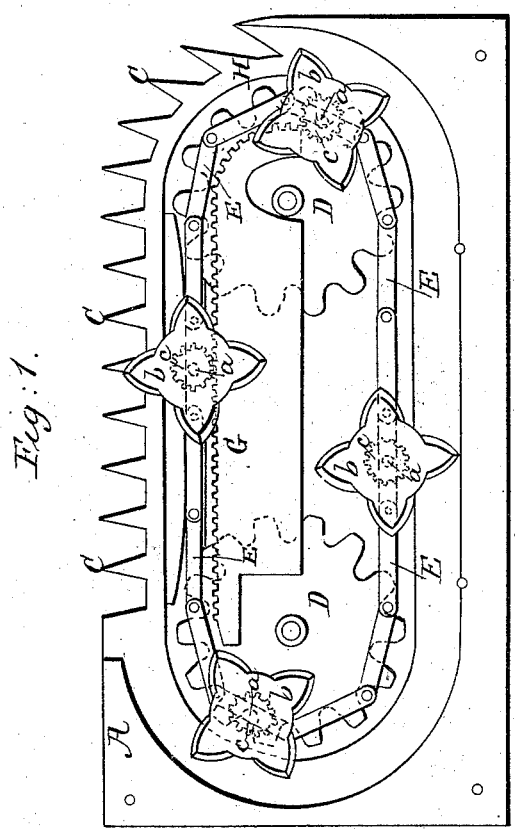
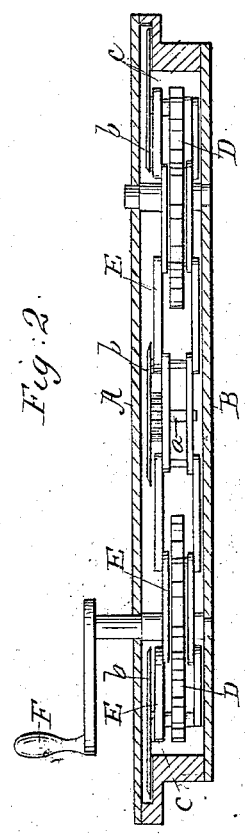

UNITED STATES PATENT OFFICE.

WILLIAM DRIPPS, OF COATESVILLE, PENNSYLVANIA.

IMPROVEMENT IN HARVESTERS.

Specification forming part of Letters Patent No. 15,843, dated October 7, 1856.

*To all whom it may concern:*

Be it known that I, WILLIAM DRIPPS, of Coatesville, in the county of Chester and State of Pennsylvania, have invented certain new and useful Improvement in the Cutting Apparatus of Harvesting-Machines; and I do hereby declare the following to be a full, clear, and exact description of the same, reference being had to the accompanying drawings, making a part thereof, in which—

Figure 1 represents a top plan with the top plate removed. Fig. 2 represents a longitudinal section through the platform. Fig. 3 represents a transverse section through the platform. Fig. 4 represents one of the cutters detached and turned upside down.

Similar letters of reference, where they occur in the separate figures, denote like parts of the apparatus.

The nature of my invention consists in giving the cutters two motions—viz., one around their own axis and the other a traveling motion along the platform. These may be termed a "drawing" and "traveling" cut.

To enable others skilled in the art to make and use my invention, I will proceed to describe the same with reference to the drawings.

A represents the top of any ordinary platform of a harvesting-machine, and B the bottom thereof, the two pieces forming a case for containing the parts to be hereinafter described.

C represents the fingers or guards for receiving, dividing, and holding the stalks of grain or grass against the action of the cutters and for protecting said cutters.

At or near each end of the platform is placed a toothed pulley-wheel, D, around which passes an endless chain, E. The shaft of the pulley next to the driving or supporting wheel may extend upward sufficiently far to receive a bevel-pinion, which may mesh with another bevel-gear on or driven by the main wheel to give said shaft and its pulley motion, and through said pulley, by means of the endless chain E, to give motion to the other pulley arranged at or near the outer end of the platform. Any other gearing will serve the purpose that will produce the same effect as the turning of the crank F will produce.

A rack, G, is connected to the platform, which may only extend around the front portion of the platform, and on the chain E is placed any suitable number of star-shaped or circular cutters, b, that will revolve on their axes, said cutters having for this purpose each a shaft, a, which sets in the links of the chain E, using said links as boxes for the said shaft.

On each of the shafts a is placed a pinion, c, which take into the rack G as they come around, and this sets each shaft and its cutter in rapid rotation about its axis as the chain carries them along the platform, and they thus have two motions—viz., a traveling one by the chain and a rotating one by the pinion c and rack G. The rack G might extend all the way around; but as the cutters are only in active operation at the front of the platform it would be needless to continue the rotation of the cutters farther than where they meet the grain or grass to be cut.

The outer end of the platform is rounded off, as seen at H. This admits of putting the cutters in rotation before they reach the front of the platform and before they come into general contact with the stalks, &c. Besides this advantage, more than a fair proportion of the stalks will crowd toward the outer end of the platform, and the cutters being set in motion a little back of the front line of the platform facilitates the cutting of the excess of stalks at that point. The other end of the platform, though not so important, may also be rounded off, and the cutters continued in rotation until they have passed said rounded part. This is readily done by merely extending the rack G, as the cutters will rotate so long as their pinions take into said rack.

I prefer cutters such as are shown in the drawings—viz., of a star shape with lozenge-shaped blades—for this reason that with this form both sides or edges of the blades may be sharpened and the series may be run in one direction until the edges are dulled, and then they may be run in the contrary direction, using the other cutting-edges. If made hook or sickle shaped, they must be always run in one direction. These cutters can be lifted out of the chain readily when they are to be resharpened or repaired, and an opening may be made through the platform for gaining ready access to them, said opening being closed at other times than when working with the cutters.

To arrange the cutters for running in either direction along the platform it is only necessary to place two bevel-wheels on the shaft of one of the pulley-wheels—one above and one below the bevel-gear that is to drive them—and so place them on said shaft that either can be brought into gear with the main driver at pleasure, and thus the chain can be run in either direction.

Having thus fully described the nature of my invention, what I claim therein as new, and desire to secure by Letters Patent, is—

The giving to the cutters of a harvesting-machine a traveling and a rotating motion at the same time, and by means substantially such as herein described.

WILLIAM DRIPPS.

Witnesses:
    THOS. H. UPPERMAN,
    E. COHEN.